United States Patent [19]

Hurley et al.

[11] Patent Number: 4,937,710

[45] Date of Patent: Jun. 26, 1990

[54] VENTILATION SYSTEM FOR HEADLAMP

[75] Inventors: Patrick J. Hurley; Michael E. Lines; Marian Kulesz, all of Anderson, Ind.

[73] Assignee: General Motors Corporation, Detroit, Mich.

[21] Appl. No.: 182,692

[22] Filed: Apr. 18, 1988

[51] Int. Cl.[5] .................. B60Q 1/00

[52] U.S. Cl. .................. 362/61; 362/294; 362/373

[58] Field of Search .................. 362/61, 80, 267, 345, 362/373, 96, 294, 264

[56] References Cited

U.S. PATENT DOCUMENTS

| | | | |
|---|---|---|---|
| 4,635,173 | 1/1987 | Dressler et al. | 362/373 |
| 4,658,339 | 4/1987 | Tammerrijn et al. | 362/373 |
| 4,739,458 | 4/1988 | Yamayoshi et al. | 362/294 |
| 4,744,011 | 5/1988 | Tomita et al. | 362/294 |
| 4,747,032 | 5/1988 | Weber | 362/294 |

FOREIGN PATENT DOCUMENTS

| | | | |
|---|---|---|---|
| 3220704 | 3/1984 | Fed. Rep. of Germany . | |
| 3424205 | 1/1986 | Fed. Rep. of Germany | 362/373 |
| 7612166 | 11/1976 | France | 362/294 |
| 2069120 | 8/1981 | United Kingdom | 362/294 |

*Primary Examiner*—Stephen F. Husar
*Assistant Examiner*—D. M. Cox
*Attorney, Agent, or Firm*—Edward J. Biskup

[57] ABSTRACT

A ventilation system for a replaceable bulb headlamp that has a vent device which, when combined with a reflector housing of the headlamp, creates a spiraling passage through which air is capable of flowing into and out of the interior of the headlamp.

3 Claims, 2 Drawing Sheets

VENTILATION SYSTEM FOR HEADLAMP

This invention concerns headlamps of the replaceable bulb type and more particularly relates to a ventilation system for such headlamps.

More specifically, the present invention is directed to a ventilating system for headlamps having a reflector housing provided with a parabolic reflecting surface integrally formed with a top wall and a bottom wall and adapted to be closed by a lens. The headlamp housing is characterized in that a first mounting hole is formed in the top wall and a second mounting hole is formed in the bottom wall, and a vent device made of an elastomeric material is located in each of the mounting holes. The vent device includes a circular base formed with a circular skirt surrounding the perimeter of the base. An upstanding plug is formed integrally with the base at a central portion thereof and has a frusto-conical head which extends through the mounting hole into the interior of the headlamp of the headlamp. An opening is formed in the plug along the longitudinal center axis thereof which begins at the frusto-conical head and terminates adjacent the base. In addition, a wall in the form of a spiral is connected at its inner end to the plug and is connected at its outer end to the skirt and cooperates with the exterior surface of the housing to form a spiraling passage. Also, an opening is provided in the base adjacent the skirt so that air can flow via the spiraling passage to and through the opening in the plug and into and out of the headlamp to vent the interior thereof.

The objects of the present invention are to provide a new and improved ventilating system for a replaceable bulb headlamp that has a vent device which when combined with the reflector housing of the headlamp creates a spiraling passage through which air is capable of flowing into and out of the interior of the headlamp; to provide a new and improved ventilation system for a replaceable bulb headlamp that incorporates a vent device suitable for use in small confined areas and which reduces the distance for air travel to evacuate the interior of the headlamp by having a spiraling channel formed therein which becomes a spiraling passage when combined with the reflector housing of the headlamp; and to provide a new and improved headlamp assembly having a reflector housing provided with a rectangular front face defined by a parabolic reflecting surface and top and bottom walls each of which carries a vent device in the form of a plug formed with a spiraling passage which prevents dust and dirt from entering the interior of the headlamp and allows air to enter and exit the headlamp for ventilating the interior of the headlamp.

Figure 1:
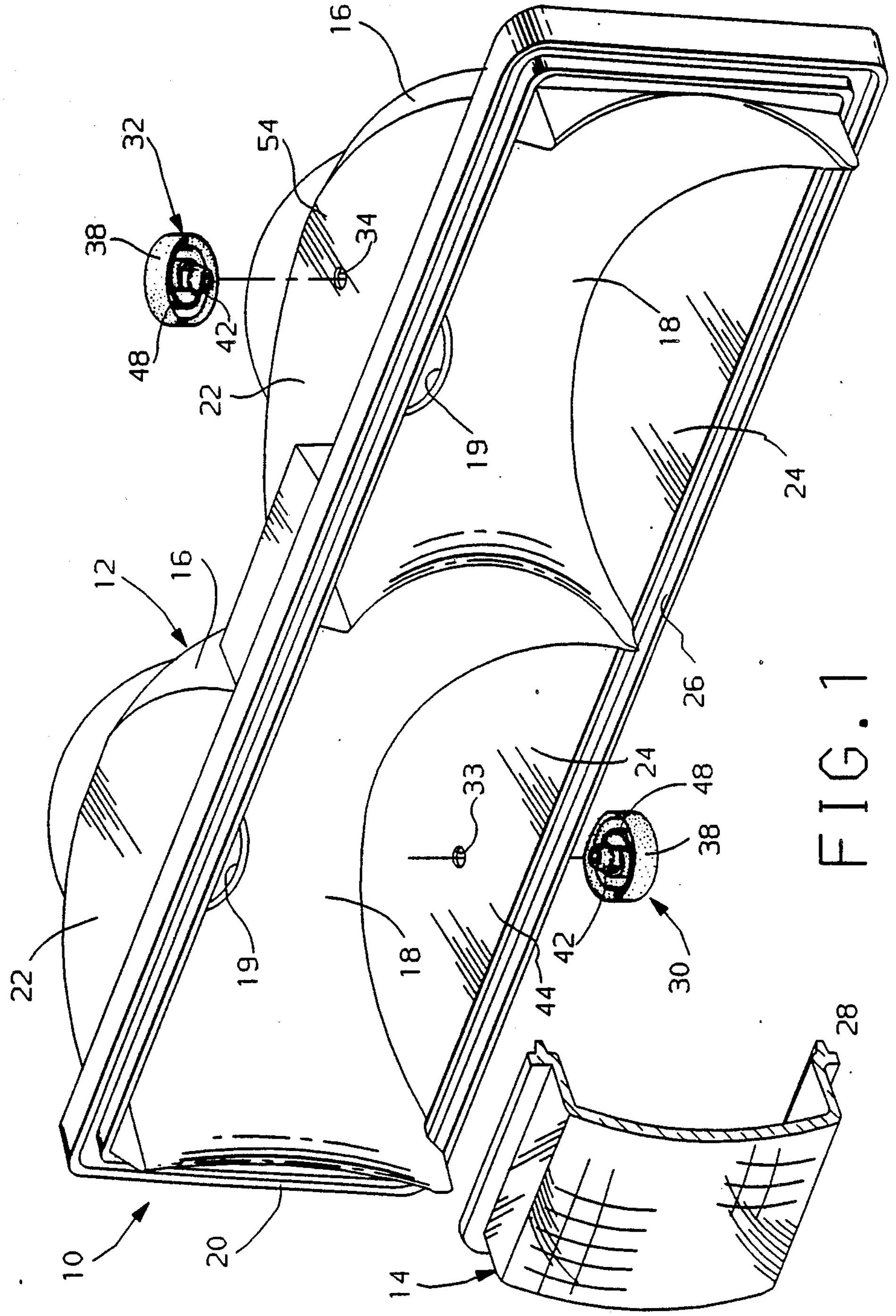
Figure 2:
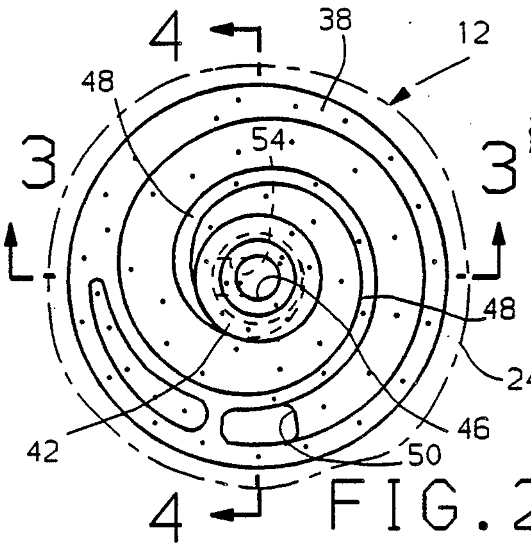
Figure 3:
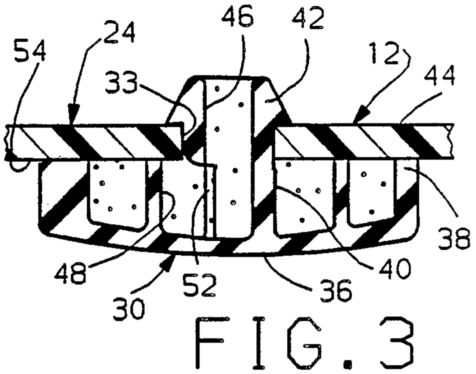
Figure 4:
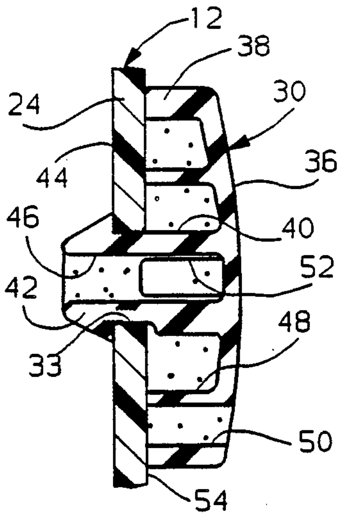
Figure 5:
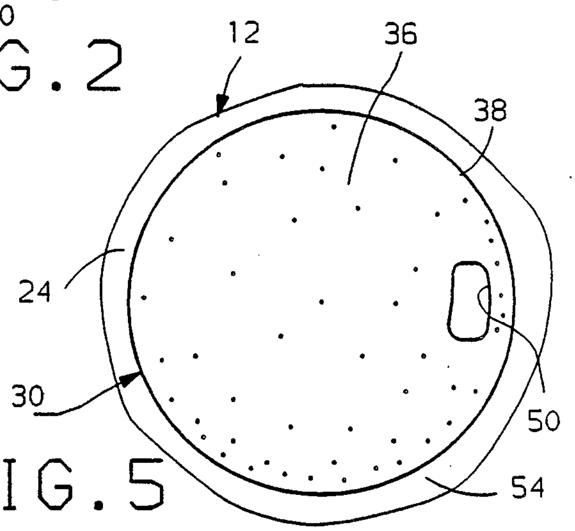
Figure 6:
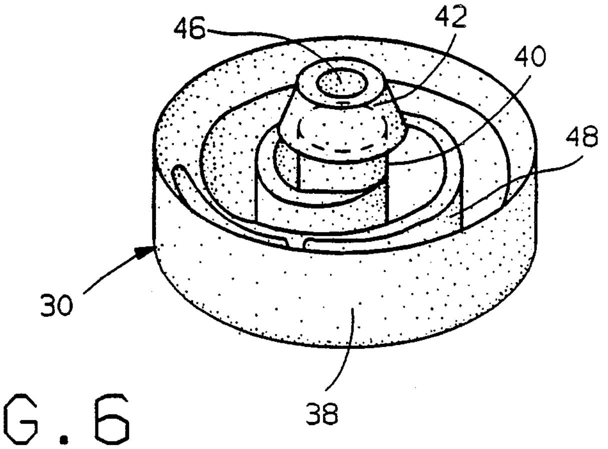

Other objects and advantages of the present invention will be more apparent from the following detailed description when taken with the drawings in which FIG. 1 is an exploded view of a replaceable bulb headlamp showing the various parts thereof which form the ventilation system in accordance with the present invention;

FIG. 2 is a view from the interior of the headlamp of one of the vent devices when installed in one of the walls of the reflector member;

FIGS. 3 and 4 are sectional views taken on lines 3—3 and 4—4 respectively of FIG. 2;

FIG. 5 is a view of the vent device of FIG. 2 when viewed from the exterior of the headlamp; and FIG. 6 is a perspective view of the vent device seen in FIGS. 2 through 5.

Referring now to the drawings and more particularly FIG. 1 thereof a replaceable headlamp 10 is shown of the rectangular type comprising a reflector member 12 made of a plastic material and having the front face thereof adapted to be closed by a glass or plastic lens 14. In this instance, the reflector member 12 includes a pair of side-by-side cavities each of which is formed by a parabolic portion 16 which is aluminized so as to provide a parabolic concave reflecting surface 18 for projecting a forwardly directed beam of light provided by a replaceable bulb (not shown) positioned within a socket 19 located in the center of the associated cavity.

More specifically, the front face of the reflector member 12 is defined by a rectangular flange 20 integrally formed with and surrounding the open end of the two parabolic portions 16. A horizontally orientated top wall 22 and a horizontally orientated bottom wall 24 integrally formed with each of the parabolic portions are also integral with the flange 20. A continuous channel 26 of uniform depth is formed in the flange 20 of the reflector member 12 around the entire margin of the front face thereof. As is conventional, the lens 14 has a flange 28 adapted to be located within the channel 26 and to be bonded to the front face of the reflector member 12 by an adhesive such as butyl rubber which can also serve as a sealant.

In order to vent the headlamp 10 so as to prevent moisture from collecting in the interior thereof, a ventilation system is provided which, as seen in FIG. 1, includes a pair of vent devices 30 and 32 which are intended to be mounted in a pair of circular mounted holes 33 and 34 formed respectively in the top wall 22 and bottom wall 24 of the reflector member 12. Each of the vent devices 30 and 32 is identical in construction and, consequently, the vent device 30 seen in FIGS. 2–6 shall be described in detail and the corresponding parts thereof found in the vent device 32 shall be identified by the same reference numerals.

In this regard, as best seen in FIGS. 2 through 6, the vent device 30 is a molded elastomeric part shown located within the mounting hole 33 of the bottom wall of the reflector member 12. The vent device 30 includes a circular base portion 36 integrally formed with a circular skirt portion 38 which completely surrounds the base portion 36. An upstanding plug portion 40 is integrally formed with and extends outwardly from the center of the base portion 36 and terminates with a frusto-conical head 42 which, as seen in FIGS. 3 and 4, is located adjacent the interior surface 44 of the wall 24. An opening 46 extends centrally and axially through the plug portion 40 begining at the head 42 thereof and terminating adjacent the base portion 36. A wall 48 in the form of a spiral is integral with the base portion 36 and also has its inner end integral with the plug portion 40 and its outer end integral with the skirt portion 38. Thus, as seen in FIG. 6, the wall 48 and the skirt portion 38 define a spiraling channel which begins at the plug portion 40 and ends adjacent the skirt portion 38. A slot 50 formed in the base portion 36 and a slot 52 formed in the plug portion 40 allow the spiraling channel to serve as a conduit or passage when the vent device 30 is mounted within the hole 34 as seen in FIGS. 3 and 4 for allowing air to flow into and out of the interior of the headlamp. As best seen in FIGS. 2 and 4, the slot 50 serves to connect the spiralling passage with atmosphere.

Thus, as seen in FIG. 1, when the vent devices 30 and 32 are installed into the mounting holes 33 and 34, air can flow between the two vent devices 30 and 32 through the interior of the headlamp 10 for ventilation purposes. Also, installation of each of the vent devices 30 and 32 is a simple matter requiring no more than pushing the plug portion 40 of each vent device 30 and 32 into its accommodating mounting hole. As seen in FIGS. 3 and 4, the major diameter of the head 42 is greater than the diameter of the associated mounting hole 33, and consequently when the vent device 30 is being pushed into the opening of the hole 33, the head being made for a resilient material, is compressed radially inwardly and afterwards expands radially outwardly to its normal shape to seal the hole 33. At the same time, the free ends of the spiraling wall 48 and the skirt 38 make sealing contact with the outer surface 54 of the reflector member 12 and form the spiraling passage so air flow can be provided via opening 46, slot 52, the spiralling passage, and the slot 50.

Various changes and modifications can be made in the above described ventilating system without departing from the spirit of the invention. Such changes and modifications are contemplated by the inventors, and they do not wish to be limited except by the scope of the appended claims.

The embodiments of the invention in which an exclusive property or privilege is claimed are defined as follows:

1. In combination with a headlamp having a generally rectangular housing provided with a parabolic reflecting surface integrally formed with a top wall and a bottom wall and adapted to be closed by a lens, a pair of mounting holes formed in said housing, a vent device located in each of said mounting holes, said vent device including a base formed with a skirt surrounding the entire perimeter of said base, an upstanding plug formed integrally with said base and having a frusto-conical head which extends through the associated mounting hole into the interior of said headlamp for securing the vent device to said housing, an opening in said plug beginning at said head and terminating adjacent said base, a wall in the form of a spiral connected at its inner end to said plug and at its outer end to said skirt and cooperating with said housing to form a spiraling passage, and a slot prvided in said base adjacent said skirt so that air can flow via said spiraling passage to and through said opening in said plug and into and out of the interior of said headlamp to vent the latter.

2. In combination with a headlamp having a generally rectangular housing provided with a parabolic reflecting surface integrally formed with a top wall and a bottom wall and adapted to be closed by a lens, a first mounting hole formed in said top wall and a second mounting hole formed in said bottom wall, a vent device located in each of said mounting holes in said bottom wall and in said top wall, said vent device being made of an elastomeric material and including a circular base formed with a circular skirt surrounding the perimeter of said base, an upstanding plug formed integrally with said base and having a frusto-conical head which extends through the associated mounting hole into the interior of said headlamp for securing the vent device to said housing, a central opening formed in said plug along the longitudinal axis thereof beginning at said head and terminating adjacent said base, a wall in the form of a spiral integrally formed with said base and connected at its inner end to said plug and at its outer end to said skirt and cooperating with the exterior surface of said housing to form a spiraling passage, and a slot provided in said base adjacent said skirt so that air can flow via said spiraling passage to and through said opening in said plug and into and out of the interior of said headlamp to vent the latter.

3. In combination with a headlamp having a generally rectangular housing provided with a pair of side by side cavities each of which has parabolic reflecting surface integrally formed with a top wall and a bottom wall, a rectangular flange integrally formed with said top wall, bottom wall and said reflecting surface of each of said cavities and defining an open face adapted to be closed by a lens, a first mounting hole formed in said top wall and a second mounting hole formed in said bottom wall, a vent device located in each of said mounting holes in said bottom wall and in said top wall, said vent device being made of an elastomeric material and including a circular base formed with a circular skirt surrounding the perimeter of said base, an upstanding cylindrical plug formed integrally with the central portion of said base and having a frusto-conical head which extends through the associated mounting hole into the interior of said headlamp for securing the vent device to said housing, an opening extending axially through said plug beginning at said head and terminating adjacent said base, a wall in the form of a spiral connected at its inner end to said plug and at its outer end to said skirt and cooperating with said housing to form a spiraling passage, and slot provided in said base adjacent said skirt and connecting said passage with atmosphere so that air can flow via said spiraling passage to and through said opening in said plug and into and out of the interior of said headlamp to vent the latter.

* * * * *